US011785151B2

(12) United States Patent
Inoue

(10) Patent No.: US 11,785,151 B2
(45) Date of Patent: Oct. 10, 2023

(54) INFORMATION PROCESSING APPARATUS, FLOW EXECUTION METHOD, AND NON-TRANSITORY COMPUTER-READABLE STORAGE MEDIUM FOR CONTROLLING EXECUTIONS OF MULTIPLE FUNCTIONS

(71) Applicant: Takuya Inoue, Kanagawa (JP)

(72) Inventor: Takuya Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/456,461

(22) Filed: Nov. 24, 2021

(65) Prior Publication Data

US 2022/0174161 A1 Jun. 2, 2022

(30) Foreign Application Priority Data

Nov. 30, 2020 (JP) .................................. 2020-198334

(51) Int. Cl.
*H04N 1/00* (2006.01)
(52) U.S. Cl.
CPC ....... *H04N 1/0048* (2013.01); *H04N 1/00474* (2013.01); *H04N 2201/0094* (2013.01)
(58) Field of Classification Search
None
See application file for complete search history.

(56) References Cited

U.S. PATENT DOCUMENTS

| | | | | |
|---|---|---|---|---|
| 2007/0106987 | A1* | 5/2007 | Makino | G06F 9/4881 370/254 |
| 2011/0296439 | A1* | 12/2011 | Kozaki | H04N 1/00954 719/318 |
| 2012/0224222 | A1* | 9/2012 | Kinoshita | G06F 3/1285 358/1.15 |
| 2017/0064120 | A1* | 3/2017 | Chung | G06F 3/1258 |
| 2018/0068345 | A1* | 3/2018 | Hirokawa | H04N 1/00482 |
| 2018/0374007 | A1* | 12/2018 | Hamada | G06F 3/1275 |
| 2019/0199883 | A1* | 6/2019 | Nojiri | H04N 1/00474 |
| 2020/0195795 | A1* | 6/2020 | Yoshimoto | G06F 3/1258 |
| 2020/0204693 | A1* | 6/2020 | Zhang | G06F 3/1205 |
| 2021/0029257 | A1* | 1/2021 | Hirokawa | H04N 1/00411 |

FOREIGN PATENT DOCUMENTS

JP   2018-046551   3/2018

* cited by examiner

*Primary Examiner* — Henok Shiferaw
(74) *Attorney, Agent, or Firm* — IPUSA, PLLC

(57) ABSTRACT

An information processing apparatus provides multiple functions including at least a first function and a second function, to an application. The information processing apparatus includes circuitry. The circuitry receives an input of a first setting value for the first function and a second setting value for the second function, the first function and the second function being used by the application to execute a flow. The circuitry, in response to an instruction to execute the flow, determines validity of the first setting value and the second setting value. The circuitry requests execution of the flow using the first setting value and the second setting value in response to a determination result indicating that the first setting value and the second setting value are valid.

11 Claims, 14 Drawing Sheets

SETTING OF SCAN FUNCTION

BLACK & WHITE DESIGNATED

SETTING OF PRINT FUNCTION

COLOR DESIGNATED

INFORMATION PROCESSING APPARATUS, FLOW EXECUTION METHOD, AND NON-TRANSITORY COMPUTER-READABLE STORAGE MEDIUM FOR CONTROLLING EXECUTIONS OF MULTIPLE FUNCTIONS

CROSS-REFERENCE TO RELATED APPLICATION

This patent application is based on and claims priority pursuant to 35 U.S.C. § 119(a) to Japanese Patent Application No. 2020-198334, filed on Nov. 30, 2020, in the Japan Patent Office, the entire disclosure of which is hereby incorporated by reference herein.

BACKGROUND

Technical Field

Embodiments of the present disclosure relate to an information processing apparatus, a flow execution method, and a non-transitory computer-readable storage medium.

Related Art

Conventionally, an image processing apparatus such as a multifunction peripheral/product/printer (MFP) can be installed with an application program (referred to simply as an "application," in the following description) developed by a third-party vendor or the like. Development of an application by a third-party vendor or the like is desirable also from the viewpoint of improving competitiveness in the market. For this reason, a manufacturer of the image processing apparatus often assists the development of an application by each third-party vendor.

For example, a technique is known that enables a third vendor or the like to develop and modify the application of the image processing apparatus in a simple manner.

SUMMARY

An embodiment of the present disclosure includes an information processing apparatus that provides multiple functions including at least a first function and a second function, to an application. The information processing apparatus includes circuitry. The circuitry receives an input of a first setting value for the first function and a second setting value for the second function, the first function and the second function being used by the application to execute a flow. The circuitry, in response to an instruction to execute the flow, determines validity of the first setting value and the second setting value. The circuitry requests execution of the flow using the first setting value and the second setting value in response to a determination result indicating that the first setting value and the second setting value are valid.

An embodiment of the present disclosure includes a flow execution method performed by an information processing apparatus that provides multiple functions including at least a first function and a second function, to an application. The method includes receiving an input of a first setting value for the first function and a second setting value for the second function, the first function and the second function being used by the application to execute a flow. The method includes, in response to an instruction to execute the flow, determining validity of the first setting value and the second setting value. The method includes requesting execution of the flow using the first setting value and the second setting value in response to a determination result indicating that the first setting value and the second setting value are valid.

An embodiment of the present disclosure includes a non-transitory computer-readable storage medium storing a plurality of instructions which, when executed by one or more processors of an information processing apparatus that provides multiple functions including at least a first function and a second function, to an application, causes the one or more processors to perform a method. The method includes receiving an input of a first setting value for the first function and a second setting value for the second function, the first function and the second function being used by the application to execute a flow. The method includes, in response to an instruction to execute the flow, determining validity of the first setting value and the second setting value. The method includes requesting execution of the flow using the first setting value and the second setting value in response to a determination result indicating that the first setting value and the second setting value are valid.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
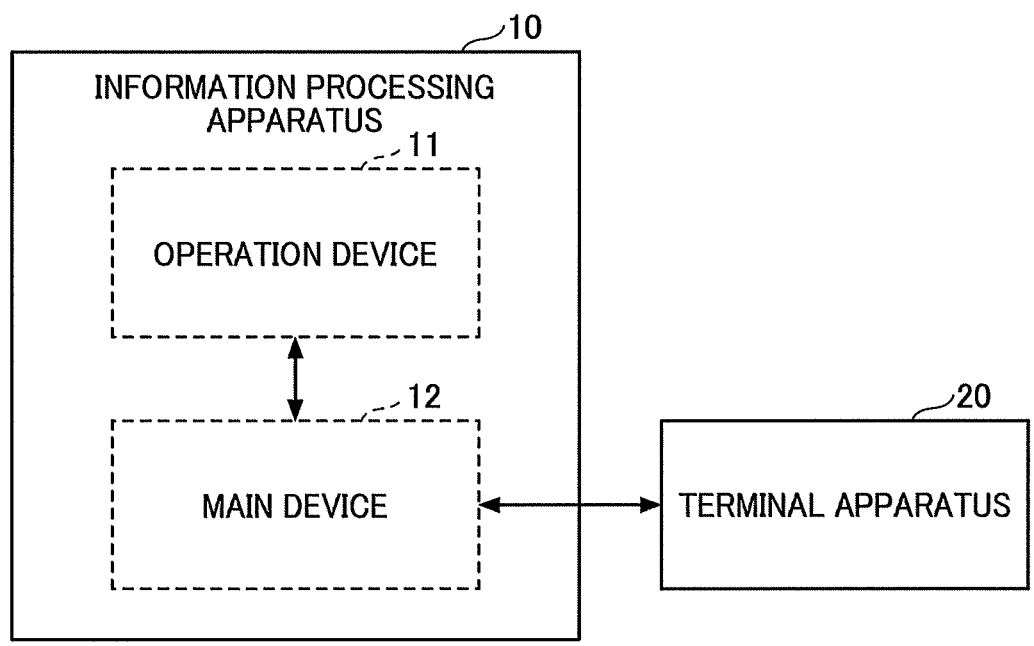
FIG. 1 is a schematic diagram illustrating an example of configuration of an information processing system, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings.

First Embodiment

System Configuration

FIG. 1 is a schematic diagram illustrating an example of a configuration of an information processing system, according to an embodiment. An information processing apparatus 10 is, for example, a multifunction peripheral/product/printer (MFP). Other examples of the information processing apparatus 10 include, but are not limited to, a projector (PJ), an interactive white board (IWB), which is an electronical whiteboard with mutual communication capability, an output device such as a digital signage, a head-up display (HUD) device, an industrial machine, and an imaging device. Still other examples of the information processing apparatus 10 include, but are not limited to, a sound collecting device, a medical device, a networked home appliance, an automobile (connected car), a mobile phone, a smartphone, a tablet terminal, a game console, a personal digital assistant (PDA), a digital camera, and a personal computer (PC).

The information processing apparatus 10 includes an operation device 11 and a main device 12. The information processing apparatus 10 has functions such as a scan function and a print function. An application is installed in the information processing apparatus 10. The information processing apparatus 10 provides multiple functions to the installed application. The following description is given of an example in which the information processing apparatus 10 provides an image processing function. However, the image processing function is merely one example of the functions provided by the information processing apparatus 10. In another example, the information processing apparatus 10 has an information processing function of performing processing on data generated by the information processing apparatus or data acquired from sources extraneous to the information processing apparatus. Examples of such the information processing function include, but are not limited to, a text data translation function, a text data editing function, a voice data processing function, and a voice data transcription function.

The operation device 11 is operated by a user for performing various user operations. For example, the operation device 11 is operated to select an image processing function to be performed by the main device 12. Further, the operation device 11 is operated to input various types of setting values for performing an image processing function by the main device 12 or instructions for starting execution of an image processing function by the main device 12, for example. Furthermore, the operation device 11 is operated to switch a display screen, for example. The main device 12 performs various types of processing such as an image processing function according to a user operation performed with the operation device 11.

Although FIG. 1 illustrates an example configuration in which the information processing apparatus 10 includes the operation device 11, in another example, a terminal apparatus 20 such as a tablet terminal, a smartphone, a mobile phone, or a PDA functions as an operation device of the information processing apparatus 10. For example, the terminal apparatus 20 communicates with the main device 12 via a communication interface (I/F) of the main device 12, to control the main device 12.

The information processing apparatus 10 can be installed with an application. The application installed in the information processing apparatus 10 provides a flow. In the description, the "flow" refers to a process (a series of processing successively executed by a plurality of functions (i.e., two or more functions) provided by the information processing apparatus 10. The information processing apparatus 10 is configured to handle the flow as one job. Examples of the functions include, but are not limited to, a function of the information processing apparatus 10, such as a scan function and a print function. The operation device 11 and the terminal apparatus 20 are configured to download one or more applications from an external server through a network and install the downloaded one or more applications in the operation device 11 or the terminal apparatus 20.

The application provides at least a first function and a second function. The second function can include processing on electronic data generated or processed by the first function. The first function and the second function may be different for each application. In the following, a description is given of a case in which a scan function is provided as an example of the first function and a print function is provided as an example of the second function. In another example, each of the first function and the second function may be another image processing function or another information processing function.

Hardware Configuration

Figure 2:
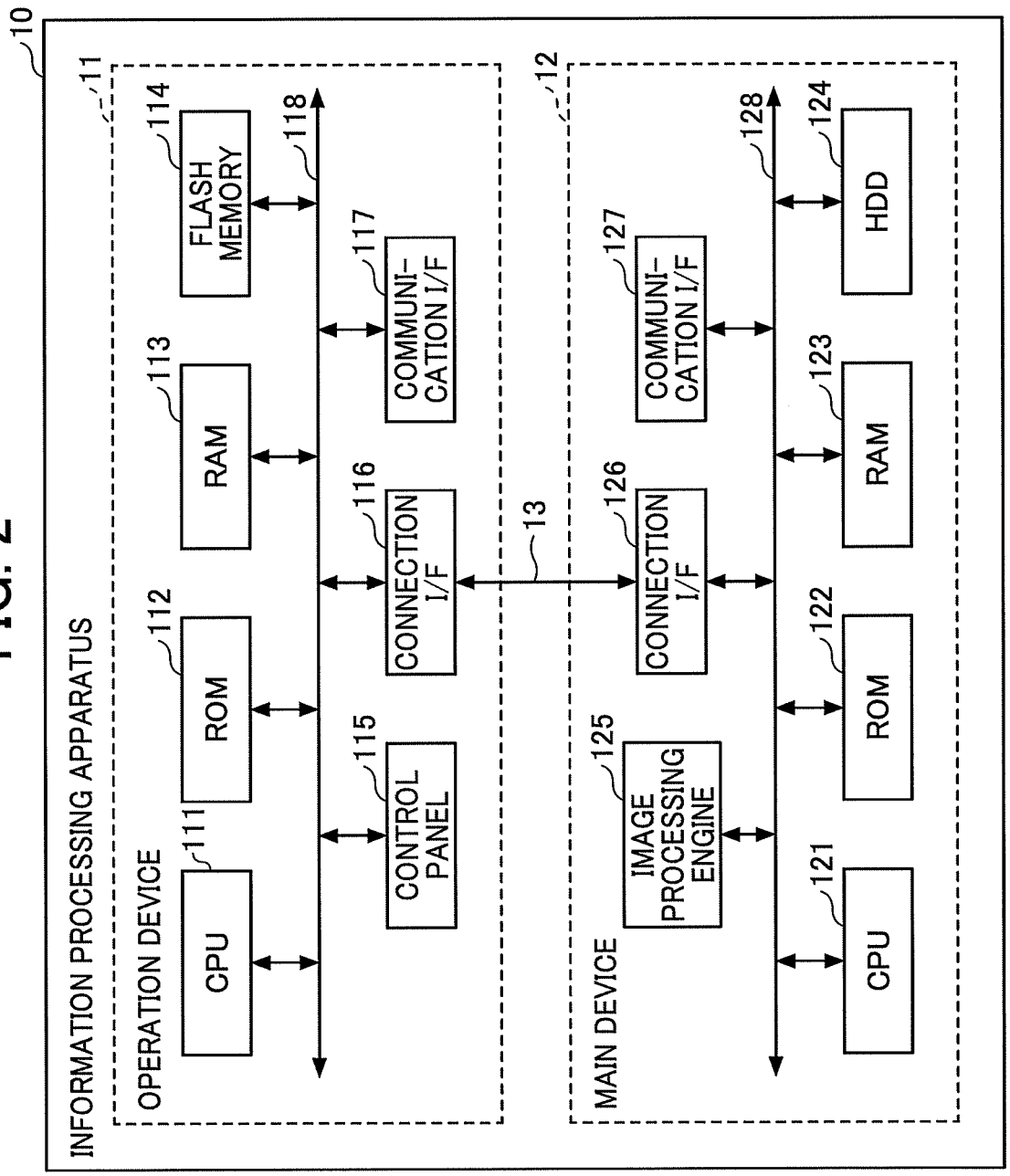
FIG. 2 is a block diagram illustrating an example of a hardware configuration of an information processing apparatus according to an embodiment of the present disclosure.

FIG. 2 is a block diagram illustrating an example of a hardware configuration of an information processing apparatus 10, according to the present embodiment. The information processing apparatus 10 according to the present embodiment includes the operation device 11 and the main device 12. The operation device 11 includes a central processing unit (CPU) 111, a read only memory (ROM) 112, a random access memory (RAM) 113, a flash memory 114, a control panel 115, a connection interface I/F 116, and a communication interface I/F 117. These hardware components communicate with each other via a bus 118.

The CPU 111 is a processor that executes various programs stored in the ROM 112 or the flash memory 114 using the RAM 113 as a work area to control overall operation of the operation device 11. The ROM 112 is a nonvolatile semiconductor memory (storage device) that stores data even after the operation device 11 is turned off as the power is not supplied. The RAM 113 is a volatile semiconductor memory that temporarily stores programs and data.

The flash memory 114 is a nonvolatile storage device, and stores various programs to be executed by the CPU 111 and various data. The control panel 115 is used by a user to perform various operations. The control panel 115 also displays various screens to the user. The connection I/F 116 is an interface that allows the operation device 11 to communicate with the main device 12 through a communication path 13. The connection I/F 116 is, for example, a universal serial bus (USB) standard interface. The communication I/F 117 is an interface that allows the operation device 11 to communicate with other devices or apparatuses. The communication I/F 117 is, for example, a wireless local area network (LAN) in compliance with wireless fidelity (Wi-Fi) standard.

The main device 12 includes a CPU 121, a ROM 122, a RAM 123, a hard disk drive (HDD) 124, an image processing engine 125, a connection I/F 126, and a communication I/F 127. These hardware components communicate with each other via a bus 128.

The CPU 121 is a processor that executes various programs stored in the ROM 122 or the HDD 124 using the RAM 123 as a work area to control overall operation of the main device 12. The ROM 122 is a nonvolatile semiconductor memory that stores data even after the main device 12 is turned off as the power is not supplied. The RAM 123 is a volatile semiconductor memory that temporarily stores programs and data.

The HDD 124 is a nonvolatile storage device, and stores various programs to be executed by the CPU 121 and various data.

The image processing engine 125 is hardware that performs image processing for implementing various image processing functions including the print function, the scan function, a copier function, and a facsimile communication function. The image processing engine 125 includes, for example, a plotter that prints an image on a paper sheet or the like, a scanner that optically reads a document to generate image data, and a facsimile communication device that carries out facsimile communication. The image processing engine 125 may further include, for example, a finisher that sorts printed sheets and/or an automatic document feeder (ADF) that automatically feeds a document.

The connection I/F 126 is an interface that allows the main device 12 to communicate with the operation device 11 through the communication path 13. The connection I/F 126 is, for example, a USB standard interface. The communication I/F 127 is an interface that allows the main device 12 to communicate with other devices or apparatuses. The communication I/F 127 is, for example, a wireless LAN in compliance with Wi-Fi standard.

The information processing apparatus 10 according to the present embodiment implements processes described below with the hardware configuration as illustrated in FIG. 2.

Figure 3:
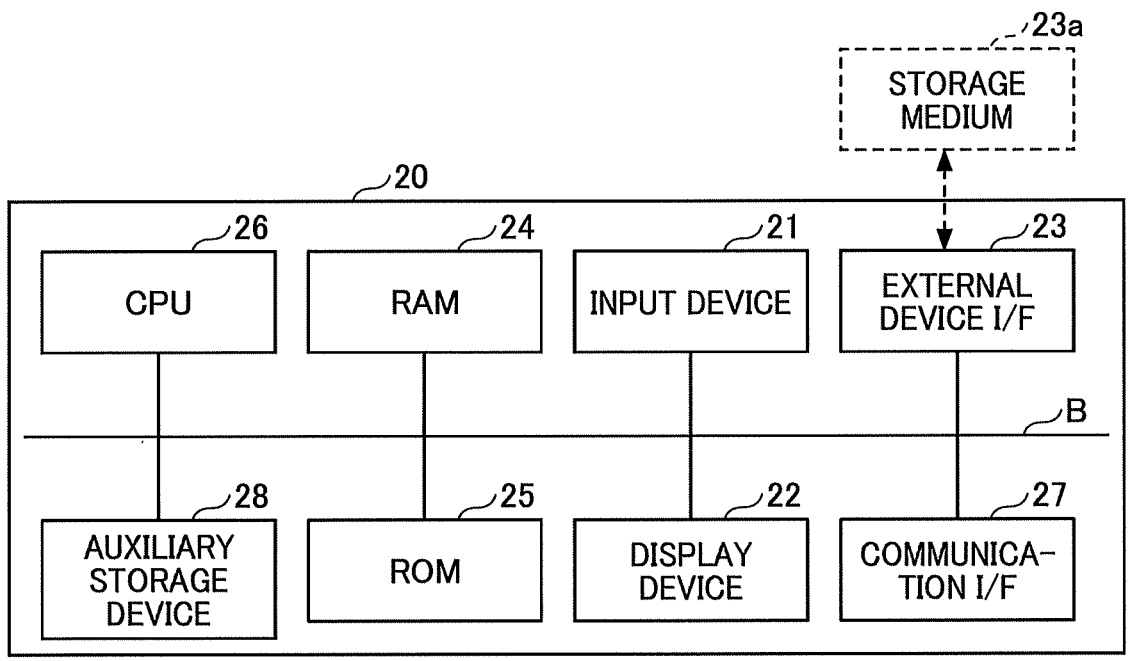
FIG. 3 is a block diagram illustrating an example of a hardware configuration of a terminal apparatus according to an embodiment of the present disclosure.

FIG. 3 is a block diagram illustrating an example of a hardware configuration of the terminal apparatus 20, according to the present embodiment. The terminal apparatus 20 includes an input device 21, a display device 22, an external device I/F 23, a RAM 24, a ROM 25, a CPU 26, a communication I/F 27, and an auxiliary storage device 28. These hardware components communicate with each other via a bus B.

The input device 21 receives various operations from a user. Examples of the input device 21 include, but are not limited to, a keyboard, a mouse, and a touch panel. The display device 22 displays a result of processes performed by the terminal apparatus 20. Examples of the display device 22 include, but are not limited to, a display. The external device I/F 23 is an interface that connects the terminal apparatus 20 to an external device. Examples of the external device include, but are not limited to, a storage medium 23a. The terminal apparatus 20 reads and writes data from and to the storage medium 23a via the external device I/F 23. Examples of the storage medium 23a include, but are not limited to, a flexible disk, a compact disc (CD), a digital versatile Disk (DVD), a secure digital (SD) memory card, and a USB memory card.

The RAM 24 is a volatile semiconductor memory that temporarily stores programs and data. The ROM 25 is a nonvolatile semiconductor memory that stores programs and data even after the terminal apparatus 20 is turned off as the power is not supplied. The ROM 25 stores, for example, operating system (OS) settings and network settings.

The CPU 26 reads programs or data from a memory such as the ROM 25 and the auxiliary storage device 28 onto the RAM 24, and executes processing. The communication I/F 27 is an interface that connects the terminal apparatus 20 to a network. The auxiliary storage device 28 is a nonvolatile storage device that stores programs and data. Examples of the auxiliary storage device 28 include, but are not limited to, an HDD and a solid state drive (SSD). The programs and data stored in the auxiliary storage device 28 includes, for example, an OS and application programs that implements various functions on the OS.

Layer Structure of Software Groups of Information Processing Apparatus

Figure 4:
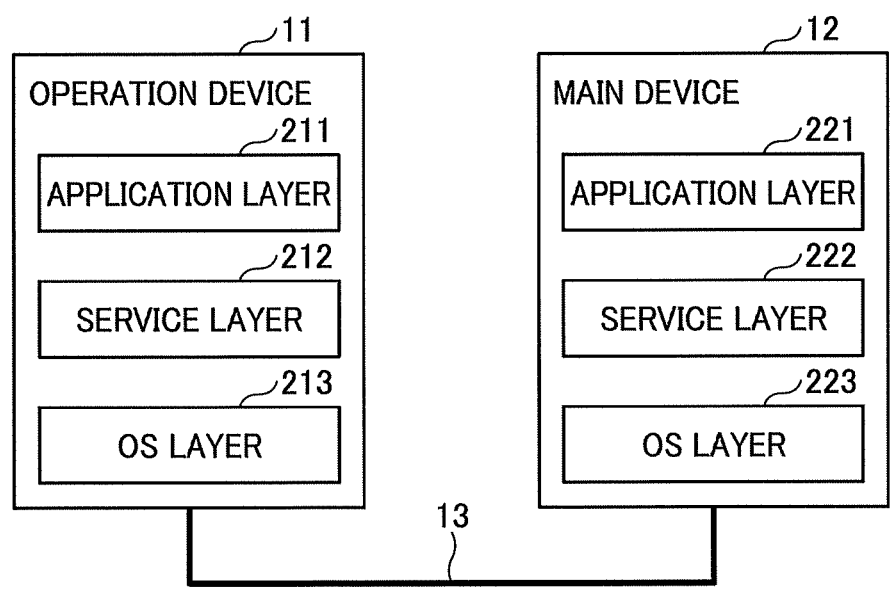
FIG. 4 is a block diagram illustrating an example of a layer structure of software groups of the information processing apparatus, according to an embodiment of the present disclosure.

FIG. 4 is a block diagram illustrating an example of a layer structure of software groups of the information processing apparatus 10, according to the present embodiment. FIG. 4 illustrates a layer structure of a software group included in the operation device 11 and another layer structure of a software group included in the main device 12.

The software group included in the main device 12 (in other words, a program group stored in the ROM 122 or the HDD 124 of the main device 12) is classified into an application layer 221, a service layer 222, and an OS layer 223.

Software classified into the application layer 221 is software that causes one or more hardware resources to operate to implement the image processing functions. Examples of the software that causes hardware resources to operate to implement the image processing functions include, but are not limited to, a print application, a scan application, a copy application, and a facsimile application.

Software classified into the service layer 222 is software that intervenes between the application layer 221 and the OS layer 223. The software classified into the service layer 222 functions as an interface that enables the software of the application layer 221 to use the hardware resources of the main device 12 and informs a state of the hardware resources of in the main device 12.

For example, the software classified into the service layer 222 receives an execution request sent to the hardware resources and arbitrates the received execution request. The execution request received by the service layer 222 includes, for example, an execution request that request the image processing engine 125 to perform image processing (e.g., a scan execution request requesting a scanner to perform scanning, and a print execution requesting a plotter to perform printing).

The function as an interface implemented by the software classified into the service layer 222 also applies in relation to the software of an application layer 211 of the operation device 11. The software classified into the application layer 211 of the operation device 11 also implements image processing function by accessing the service layer 222 to cause corresponding one or more hardware resources of the main device 12 to operate to implement the image processing functions.

The software classified into the OS layer 223 is a program of basic software (OS). The software provides basic functions for controlling hardware resources of the main device 12. The software classified into the OS layer 223 receives an execution request for hardware resources from the software classified into the application layer 221 via the software classified into the service layer 222 and executes a process corresponding to the execution request.

The software group included in the operation device 11 (in other words, a program group stored in the ROM 112 or the flash memory 114 of the operation device 11) is classified into an application layer 211, a service layer 212, and an OS layer 213, in the same or in substantially the same manner as the main device 12.

However, a function provided by executing software classified into the application layer 211 and types of execution requests received by the service layer 212 are different from those of the main device 12. The software classified into the application layer 211 of the operation device 11 mainly provides a user interface function for performing various types of operations and displays.

In the present embodiment, the OSes of the operation device 11 and the main device 12 operate individually and independently. In addition, as long as the operation device 11 and the main device 12 are communicable with each other, different types of OSes may be used. For example, the information processing apparatus 10 uses Android® as an OS of the operation device 11 and Linux® as an OS of the main device 12.

As described above, in the information processing apparatus 10 according to the present embodiment, the operation device 11 is controlled by the OS that is independent from the OS of the main device 12. Communication established between the operation device 11 and the main device 12 is performed not as an interprocess communication in a shared apparatus but as communication between two different information processing apparatuses.

However, the information processing apparatus 10 according to the present embodiment is not limited to the above-described case where the OS of the operation device 11 and the OS of the main device 12 are different from each other. In another example, the same type of OS may operate in the operation device 11 and the main device 12. In addition, the information processing apparatus 10 according to the present embodiment is not limited to the above-described case where the OS of the operation device 11 and the OS of the main device 12 operate individually and independently. In another example, a single OS may operate on the operation device 11 and the main device 12.

Functional Configuration

Figure 5:
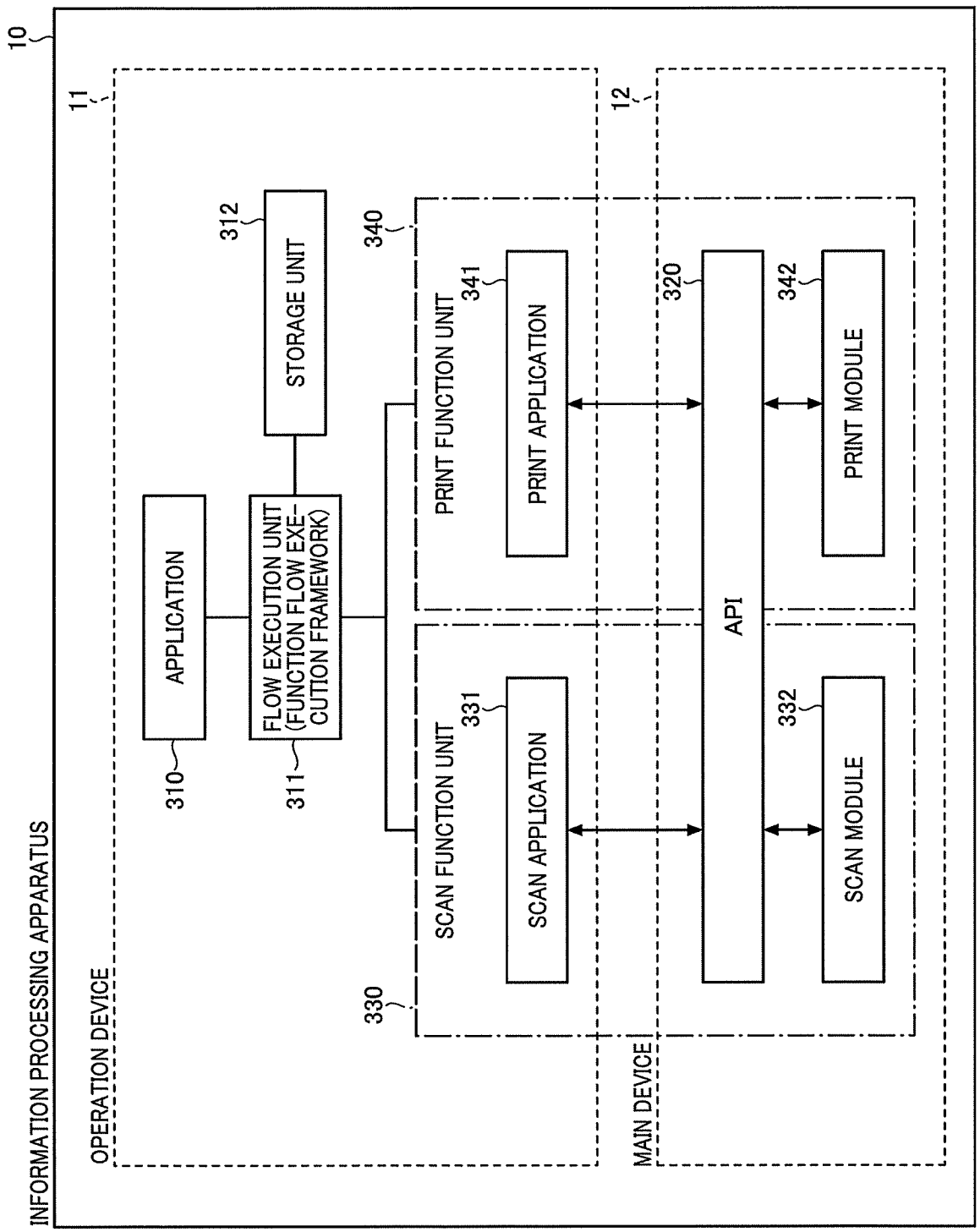
FIG. 5 is a block diagram illustrating an example of a functional configuration of the information processing apparatus, according to an embodiment of the present disclosure.

FIG. 5 is a block diagram illustrating an example of a functional configuration of the information processing apparatus 10, according to the present embodiment. The operation device 11 of the information processing apparatus 10 includes an application 310, a flow execution unit 311, a storage unit 312, a scan application 331, and a print application 341. The CPU 111 executes the application 310, the flow execution unit 311, the scan application 331, and the print application 341. The main device 12 of the information processing apparatus 10 includes an application programming interface (API) 320, a scan module 332, and a print module 342. The CPU 121 executes the scan module 332 and the print module 342.

In the following description, the scan application 331, the API 320, and the scan module 332 are referred to as a "scan function unit 330". Further, in the following description, the print application 341, the API 320, and the print module 342 are referred to as a "print function unit 340".

The scan function and the print function in FIG. 5 are merely examples of functions that the information processing apparatus 10 includes. The information processing apparatus 10 includes any one or more functions. The operation device 11 may include, for example, a copy application, a facsimile application, and an optical character recognition (OCR) application. Further, the main device 12 may include, for example, a copy module, a facsimile module, and an OCR module. The information processing apparatus 10 may include various image processing function units such as a copier function unit, a facsimile function unit, and an OCR function unit.

The application 310 is an application developed by a third-party vendor or the like and installed in the information processing apparatus 10. The application 310 provides a flow. The application 310 is developed such that the application 310 registers, when activated, information identifying multiple functions included in a flow provided by the application 310 and an execution order of the multiple functions (an order in which the multiple functions are to be executed) included in the flow in the flow execution unit 311.

In response to a request for registering a flow from the application 310, the flow execution unit 311 causes the storage unit 312 to store information identifying multiple functions included in the flow provided by the application 310 and an execution order of the multiple functions. In response to receiving a request for executing the flow from the application 310, the flow execution unit 311 executes the multiple functions included in the flow in accordance with the execution order stored in the storage unit 312.

The storage unit 312 stores the information identifying the multiple functions included in the flow provided by the application 310 and the execution order of the multiple functions included in the flow. In another example, the information identifying the multiple functions included in the flow provided by the application 310 and the execution order of the multiple functions included in the flow are stored in resources other than the information processing apparatus 10. Examples of such the resources include, but are not limited to, a server.

The scan application 331 provides a function of the operation device 11 related to a scan function. The scan application 331 provides a function of displaying, for example, a scan setting user interface (UI) and an execution UI indicating that scanning is in progress. The scan application 331 further provides a function of determining the validity of a setting value (setting value for the scan function) configured through the setting UI. Further, the scan application 331 receives a scan execution request from the flow execution unit 311. The scan application 331 requests the scan module 332 to perform scanning via the API 320.

The print application 341 provides a function of the operation device 11 related to a print function. The print application 341 provides a function of displaying, for example, a print setting UI and an execution UI indicating that printing is in progress. The print application 341 further provides a function of determining the validity of a setting value (setting value for the print function) configured through the setting UI. Further, the print application 341 receives a print execution request from the flow execution unit 311. The print application 341 requests the print module 342 to perform printing via the API 320.

The API 320 is an API via which the scan application 331 sends a scan execution request to the scan module 332. Further, the API 320 is an API via which the print application 341 sends a print execution request to the print module 342.

The scan module 332 controls the image processing engine 125 to perform scanning in response to the scan execution request from the scan application 331. The print module 342 controls the image processing engine 125 to perform printing in response to the print execution request from the print application 341. The scan module 332 provides a function of the main device 12 related to scanning. The print module 342 provides a function of the main device 12 related to printing. A framework used by a developer of the application 310 to execute a flow at the time of development functions as the flow execution unit 311. In the following description, such the framework is referred to as a "function flow execution framework".

As an example of implementation, the function flow execution framework is provided in the form of a jar file including a library of software. A developer of the application 310 obtains a file of the function flow execution framework by downloading the file from a web site of a manufacturer of the information processing apparatus 10, for example. Alternatively, a storage medium such as a disc storing the file is delivered to the developer.

For example, when developing the application 310, the developer deploys the file of the function flow execution framework in a folder inside the application 310. In another example, the developer incorporates the function flow execution framework into the application 310 to create the application 310.

Figure 6:
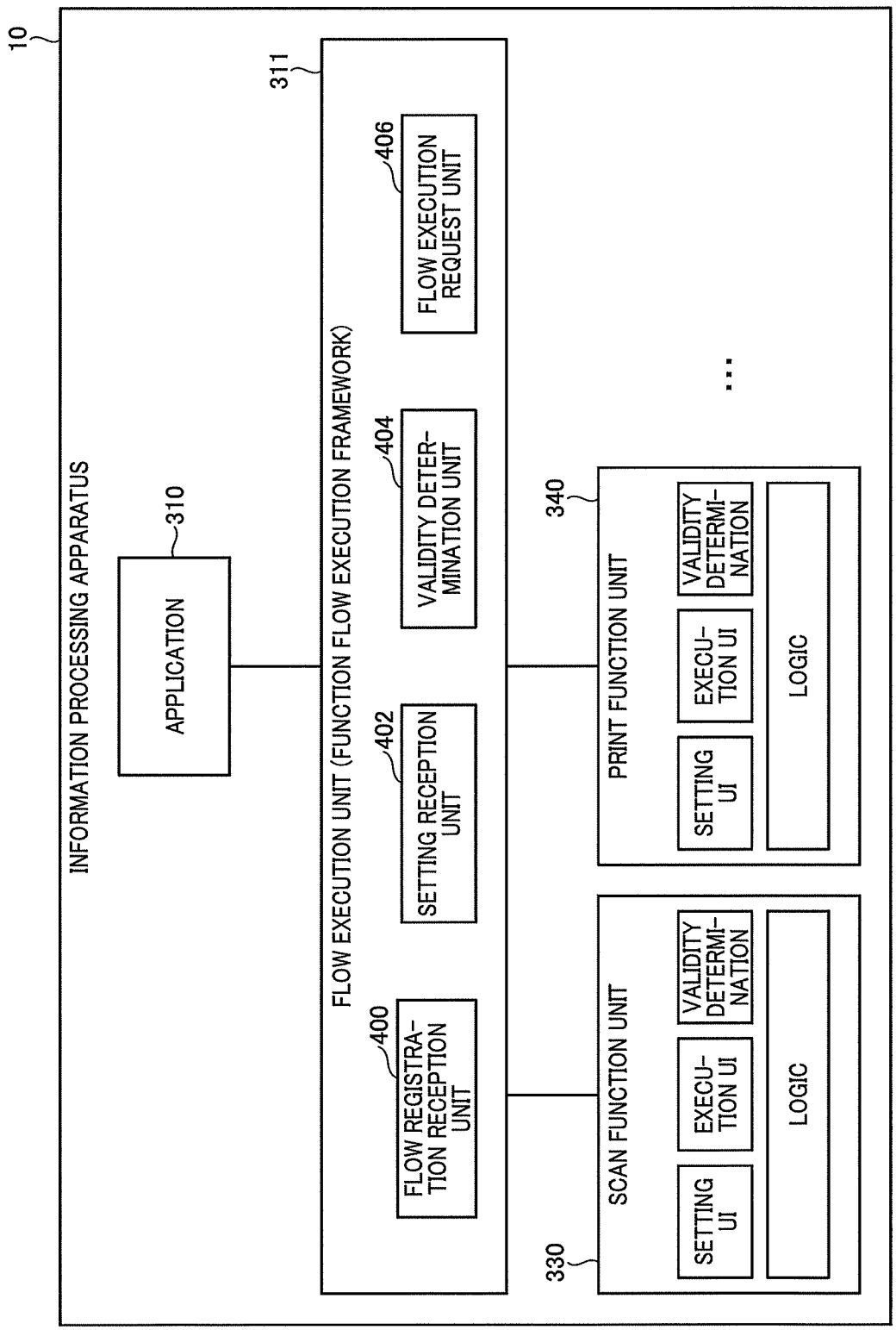
FIG. 6 is a block diagram illustrating an example of a functional configuration of a flow execution unit, according to an embodiment of the present disclosure.

FIG. 6 is a block diagram illustrating an example of a functional configuration of the flow execution unit 311, according to the present embodiment. In FIG. 6, the application 310, the scan function unit 330, and the print function unit 340 relevant to function blocks of the flow execution unit 311 is illustrated among the functional blocks of FIG. 5.

The flow execution unit 311 includes a flow registration reception unit 400, a setting reception unit 402, a validity determination unit 404, and a flow execution request unit 406. The flow execution unit 311 may be incorporated in the application 310. The application 310 uses various functions provided by the flow execution unit 311 as a software library. For example, when the application 310 arranges the file of the flow execution unit 311 in an internal folder of the application 310, various functions provided by the flow execution unit 311 are usable according to a definition of the application 310. Thus, the developer of the application 310 does not have to develop functions provided by the flow execution unit 311.

The flow registration reception unit 400 receives registration of a flow that uses multiple functions from the application 310 that is activated. The application 310 registers, in the flow execution unit 311, information identifying the multiple functions included in the flow that the application 310 provides and an execution order of the multiple functions included in the flow.

The setting reception unit 402 displays settings screens for the multiple functions used by the application 310 that is activated to execute the flow, and receives an input of setting values for the functions from a user. The setting reception unit 402 displays a settings screen for a scan function using the setting UI of the scan function unit 330, and receives an input of a setting value for a scan function from the user. The setting reception unit 402 displays a settings screen for a print function using the setting UI of the print function unit 340, and receives an input of a setting value for a print function from the user.

The validity determination unit 404 performs validity determination on the setting value for the function whose input is received by the setting reception unit 402. The validity determination unit 404 performs the validity determination (validity check) on the setting value for the function by using a validity determination function (process of validity determination) of each of the multiple functions. For example, the validity determination unit 404 performs validity determination on a setting value for the scan function by using a validity determination process of the scan function unit 330. Further, for example, the validity determination unit 404 performs validity determination on a setting value for the print function by using a validity determination process of the print function unit 340.

In response to a result of the validity determination indicating that the setting values for the multiple functions used for executing the flow are valid, the flow execution request unit 406 requests execution of the flow using the setting values for the functions. For example, the flow execution request unit 406 requests execution of scanning using a setting value for the scan function, the setting value being determined as valid. Further, for example, the flow execution request unit 406 requests execution of printing using a setting value for the print function, the setting value being determined as valid.

In response to a result of the validity determination indicating that the setting values for the multiple functions used for executing the flow are not valid, the flow execution request unit 406 displays a settings screen for a function for which the determination result indicates that the setting value is not valid, and displays an error message on the settings screen. For example, the flow execution request unit 406 displays a settings screen of the scan function for which the setting value is determined as invalid, and displays an error message on the settings screen for the scan function. Further, for example, the flow execution request unit 406 displays a settings screen of the print function for which the setting value is determined as invalid, and displays an error message on the settings screen for the print function.

The scan function unit 330 and the print function unit 340 are examples of multiple functions used by the application 310, which is activated, to execute a flow. The multiple functions used by the application 310, which is activated, to execute the flow may any suitable functions other than the scan function unit 330 and the print function unit 340. The scan function unit 330 executes scanning using the setting value for the scan function in response to a scan execution request. Further, the print function unit 340 executes printing using the setting value for the print function in response to a print execution request.

As illustrated in FIG. 6, each of the scan function unit 330 and the print function unit 340 has a validity determination process. The validity determination unit 404 is configured to perform the validity determination on the setting value for the scan function and the setting value for the print function by using the validity determination processes of the scan function unit 330 and the print function unit 340, respectively.

Operation

Figure 7:
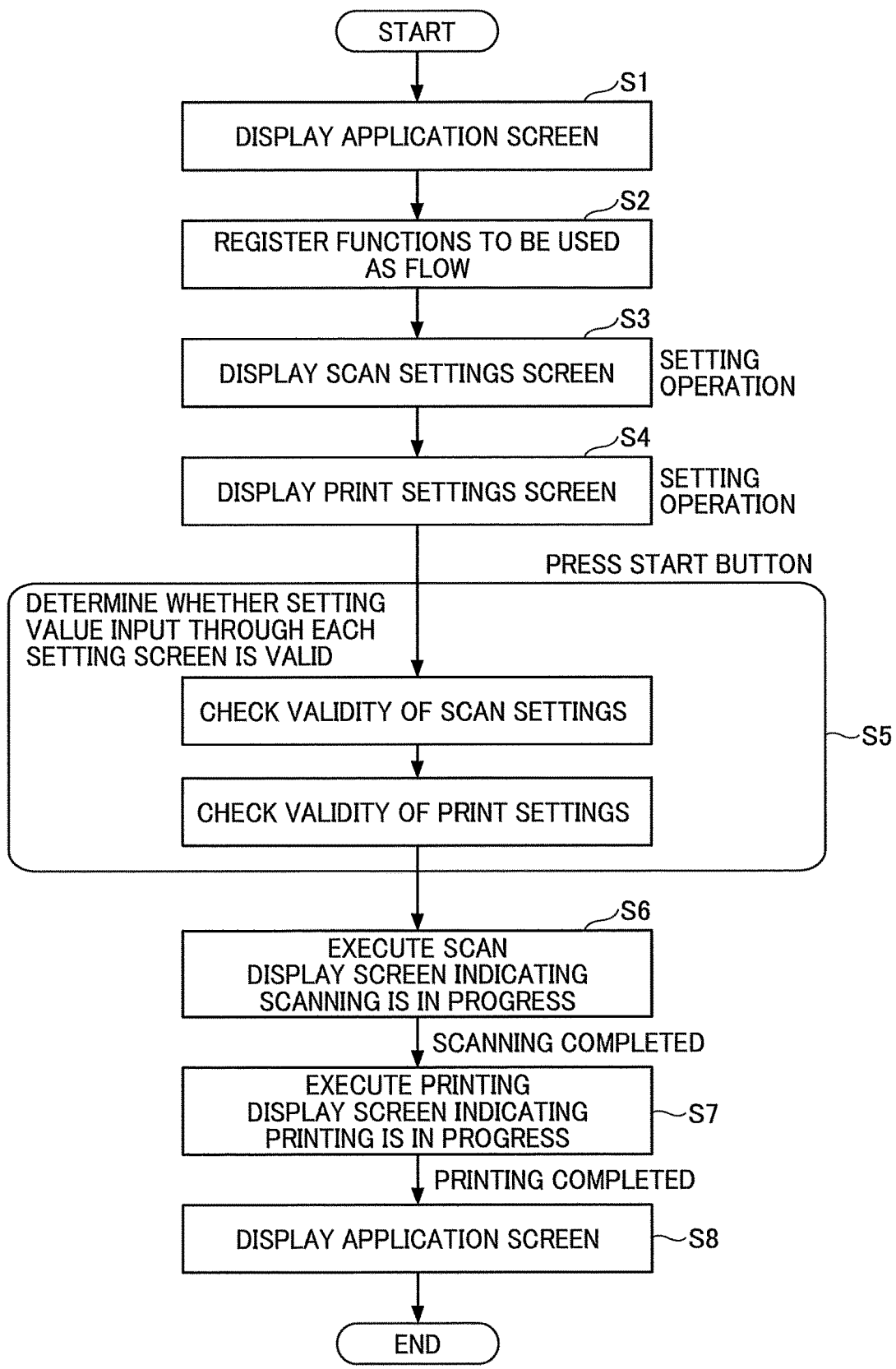
FIG. 7 is a flowchart illustrating an example of an operation performed by the information processing apparatus, according to an embodiment of the present disclosure.

FIG. 7 is a flowchart illustrating an example of an operation performed by the information processing apparatus 10, according to the present embodiment. The flowchart of FIG. 7 illustrates an example of a flow in which a print function is executed after a scan function is executed.

In step S1, the information processing apparatus 10 activates the application 310, which is installed in the information processing apparatus. The application 310 displays a screen of the application 310 on the control panel 115. In step S2, the application 310 registers functions to be used as a flow in the flow execution unit 311.

In step S3, the flow execution unit 311 displays a settings screen of the scan function on the control panel 115, to receive an input (setting operation) of a setting value for the scan function from a user. In step S4, the flow execution unit 311 displays a settings screen of the print function on the control panel 115, to receive an input (setting operation) of a setting value for the print function from a user.

In step S5, in response to an input of an execution instruction for starting execution of a flow, the flow execution unit 311 determines the validity of the setting value input on the settings screen of the scan function and the setting value input on the settings screen of the print function. Examples of the input of the execution instruction include, but are not limited to, a pressing of a start button.

When the flow execution unit 311 determines that the setting value input on the settings screen of the scan function and the setting value input on the settings screen of the print function are valid, the flow execution unit 311 executes processes of step S6 and subsequent steps. When the flow execution unit 311 determines that the setting value input on the settings screen of the scan function and the setting value input on the settings screen of the print function are invalid, the flow execution unit 311 performs processing for an error such as displaying an error message, without performing processes of step S6 and subsequent steps.

In step S6, the flow execution unit 311 requests the scan function unit 330 to perform scanning using the setting value for the scan function, to cause the scan function unit 330 to perform scanning. The flow execution unit 311 displays a screen indicating that scanning is in progress on the control panel 115. When scanning in step S6 is completed, the flow execution unit 311 requests the print function unit 340 to perform printing using the setting value for the print function, to cause the print function unit 340 to perform printing. The flow execution unit 311 displays a screen indicating that printing is in progress on the control panel 115. When printing in the step S7 is completed, the application 310 displays a screen of the application 310 on the control panel 115 in step S8.

As described above with reference to FIG. 7, the information processing apparatus 10 according to the present embodiment determines, for each function used for execution of a flow, whether the setting value is valid, before starting execution of the flow. When the determination result indicates that the setting value for each function is valid, the information processing apparatus 10 executes the flow. Thus, the information processing apparatus 10 according to the present embodiment prevents the flow using multiple functions from being interrupted during processing after execution of the flow is started, due to an error in a setting value of a function to be used second or later.

Figure 8:
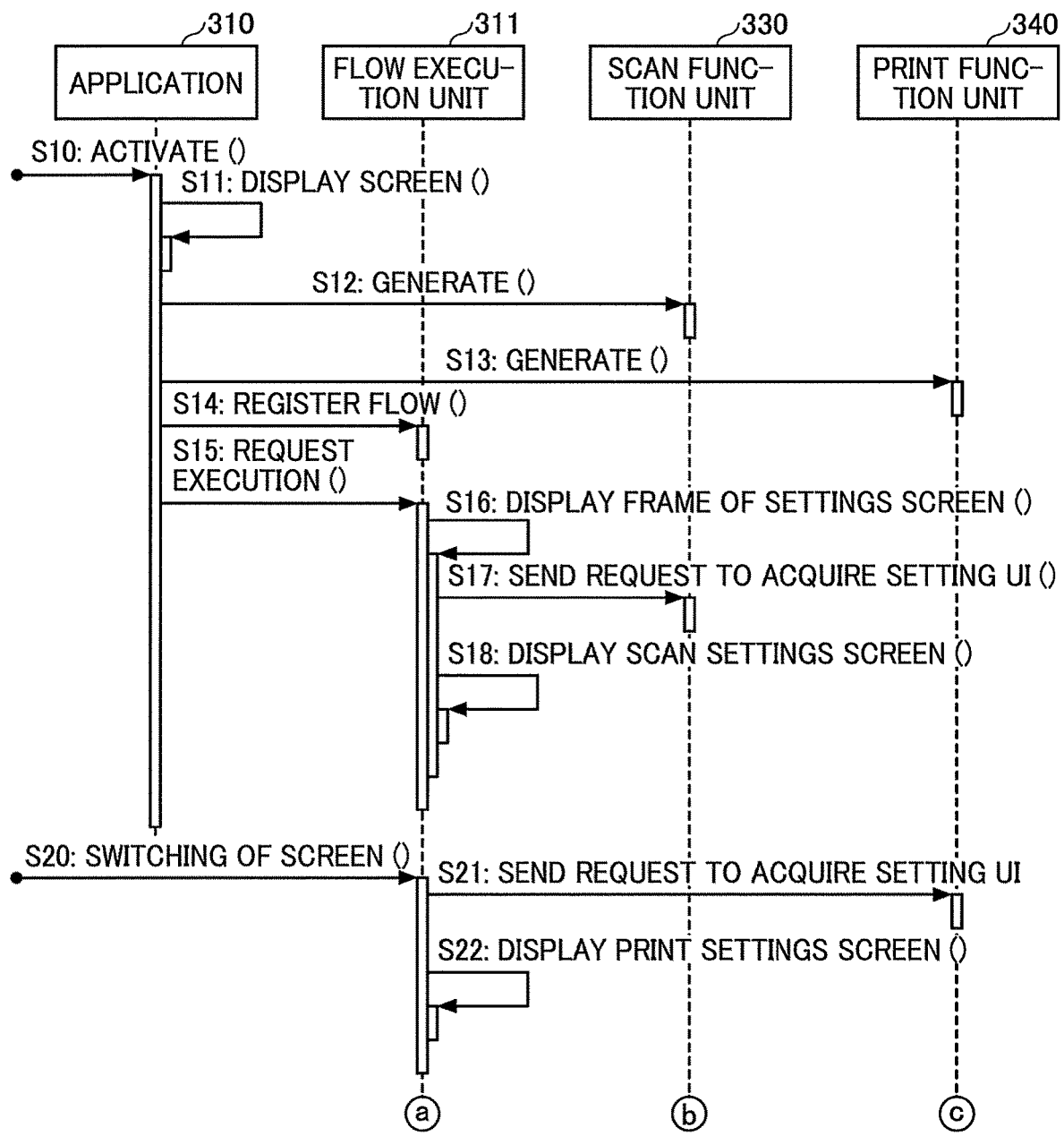
FIG. 8 is a sequence diagram (1/2) illustrating an example of operation performed by the information processing apparatus, according to an embodiment of the present disclosure.
Figure 9:
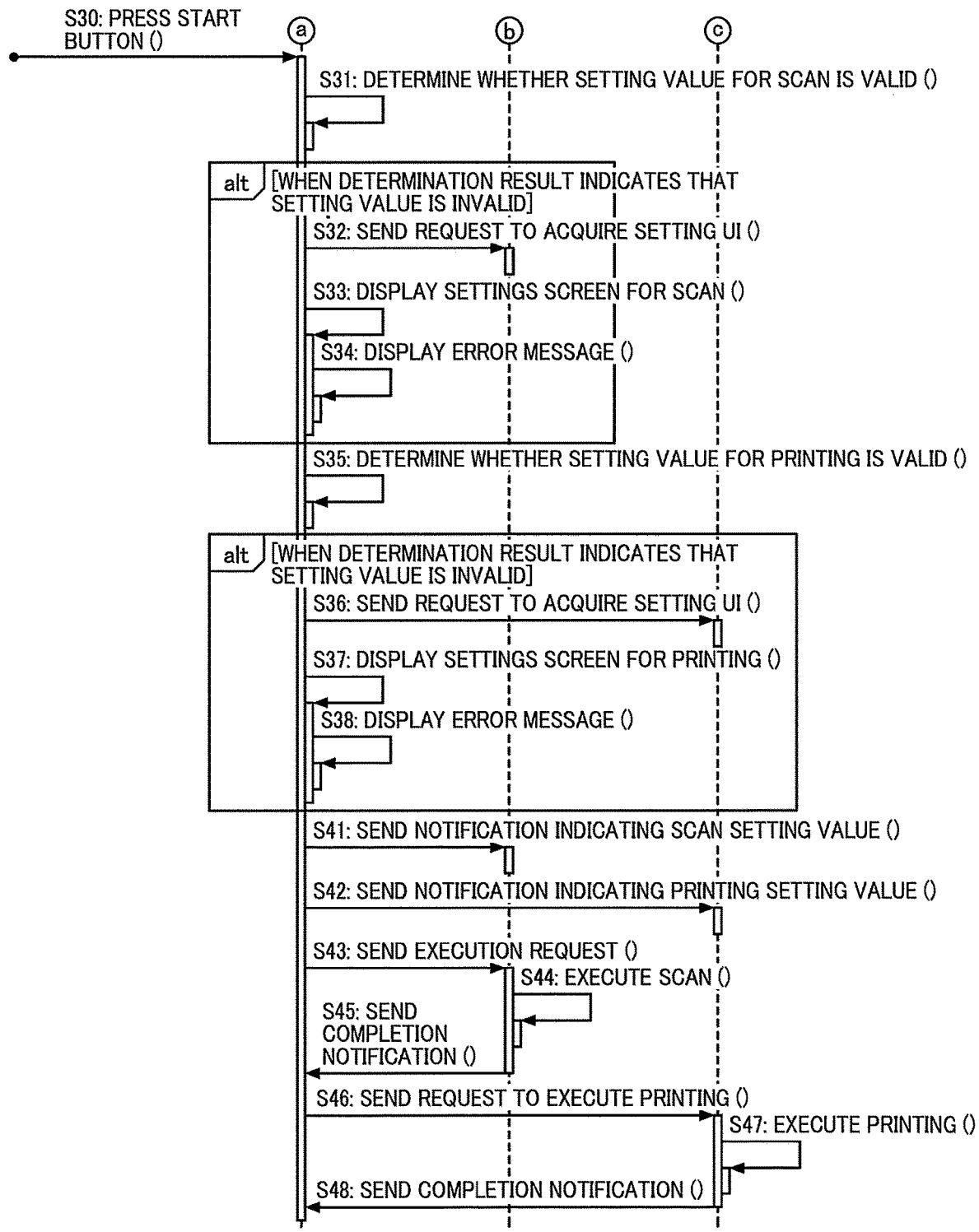
FIG. 9 is a sequence diagram (2/2) illustrating an example of operation performed by the information processing apparatus, according to an embodiment of the present disclosure.

FIG. 8 is a sequence diagram (1/2) illustrating an example of an operation performed by the information processing apparatus 10, according to the present embodiment. FIG. 9 is a sequence diagram (2/2) illustrating an example of an operation performed by the information processing apparatus 10, according to the present embodiment. FIG. 8 and FIG. 9 illustrate an example of a flow in which a print function is used after a scan function is used.

In step S10, the information processing apparatus 10 activates the application 310, which is installed in the information processing apparatus. In step S11, the application 310 displays a screen of the application 310 on the control panel 115 of the information processing apparatus 10. In steps S12 and S13, the application 310 generates objects of the scan function unit 330 and the print function unit 340 used by the flow that the application 310 provides.

In step S12, the application 310 generates an object of a scan function provided by the scan function unit 330 (e.g., the scan application 331 of the scan function unit 330). In other words, the application 310 instantiates a class. In another example, the object of the scan function provided by the scan function unit 330 may be generated by the flow execution unit 311.

In step S13, the application 310 generates an object of a print function provided by the print function unit 340 (e.g., the print application 341 of the print function unit 340). In another example, the object of the print function provided by the print function unit 340 may be generated by the flow execution unit 311.

In step S14, the application 310 registers, in the flow execution unit 311, information identifying multiple functions included in the flow that the application 310 provides and an execution order of the multiple functions included in the flow. In response to a request for registering the flow from the application 310, the flow execution unit 311 stores, in the storage unit 312, the information identifying the multiple functions included in the flow provided by the application 310 and the execution order of the multiple functions included in the flow.

The flow execution unit 311 receives the request for registering the flow from the application 310, which is activated in response to an activation instruction from a user, and stores, in the storage unit 312, the information identifying the multiple functions used by the flow and the execution order of the multiple functions included in the flow.

In step S15, the application 310 requests the flow execution unit 311 to execute the flow. In step S16, the flow execution unit 311 displays a frame portion of a settings screen on the control panel 115 of the information processing apparatus 10.

For example, a screen to be displayed on the information processing apparatus 10 has a portion (frame portion) common to settings screens of all the functions included in the flow. The frame portion includes a button that receives an input of an execution instruction relating to the flow. Examples of the button include, but are not limited to a start button, a cancel button, and a sleep button. In another example, the frame portion may be displayed by a common function of the flow execution unit 311 incorporated in the application 310.

In step S17, the flow execution unit 311 requests the scan function unit 330 to acquire a setting UI (a settings screen of the scan function). Step S17 is a process of acquiring the settings screen of the scan function whose execution order is the first among the functions included in the flow. In step S18, the flow execution unit 311 displays the settings screen of the scan function acquired in step S17 in the frame displayed in step S16. The user inputs a setting value for the scan function on the settings screen of the scan function.

In step S20, the flow execution unit 311 receives an operation of switching a screen from the settings screen of the scan function to another screen. In step S21, the flow execution unit 311 requests the print function unit 340 to acquire a setting UI (a settings screen of the print function). In step S22, the flow execution unit 311 displays the settings screen of the print function acquired in step S21 in the frame displayed in step S16. The user inputs a setting value for the print function on the settings screen of the print function.

In step S30, the flow execution unit 311 receives an input of an execution instruction for starting the execution of the flow. For example, the start button is pressed. In step S31, the flow execution unit 311 determines whether the setting value input on the settings screen of the scan function is valid. When the flow execution unit 311 determines that the setting value input on the settings screen of the scan function is invalid, the flow execution unit executes processes of steps S32 to S34.

In step S32, the flow execution unit 311 requests the scan function unit 330 to acquire a setting UI (the settings screen of the scan function). In step S33, the flow execution unit 311 displays the settings screen of the scan function acquired in step S32 in the frame. In step S34, the flow execution unit 311 performs processing to be performed when an error occurs. For example, the flow execution unit 311 displays an error message as illustrated in FIG. 10 or FIG. 11.

Figure 10:
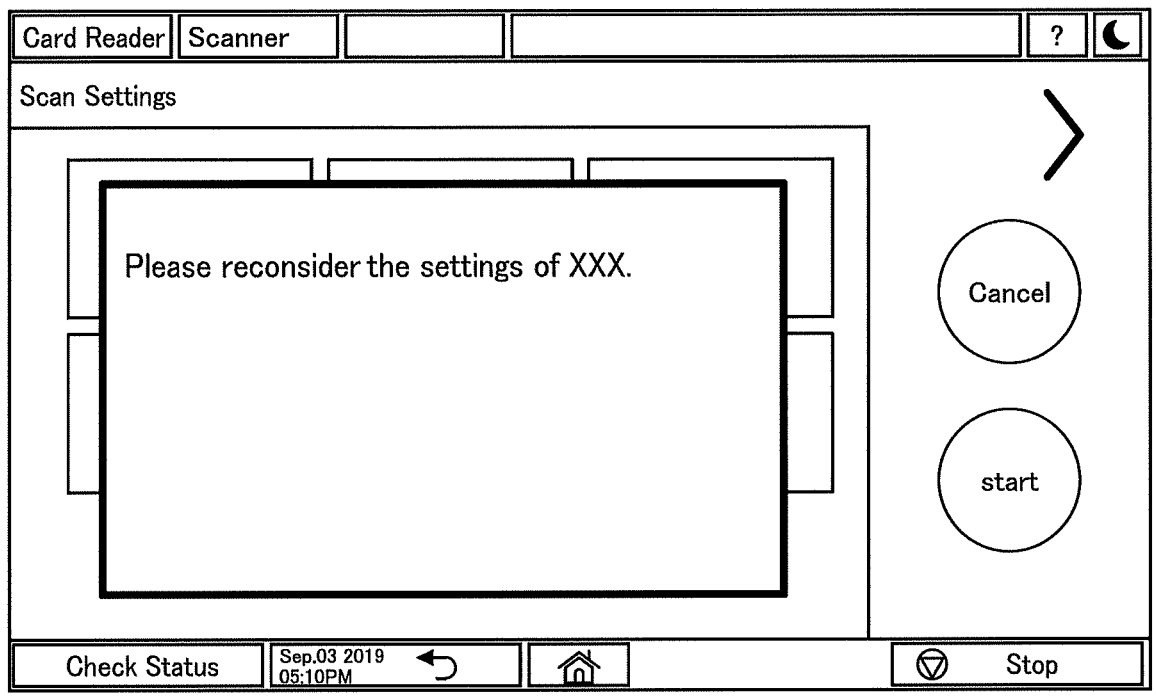
FIG. 10 is an illustration of an example of a screen displayed on the information processing apparatus, according to an embodiment of the present disclosure.
Figure 11:
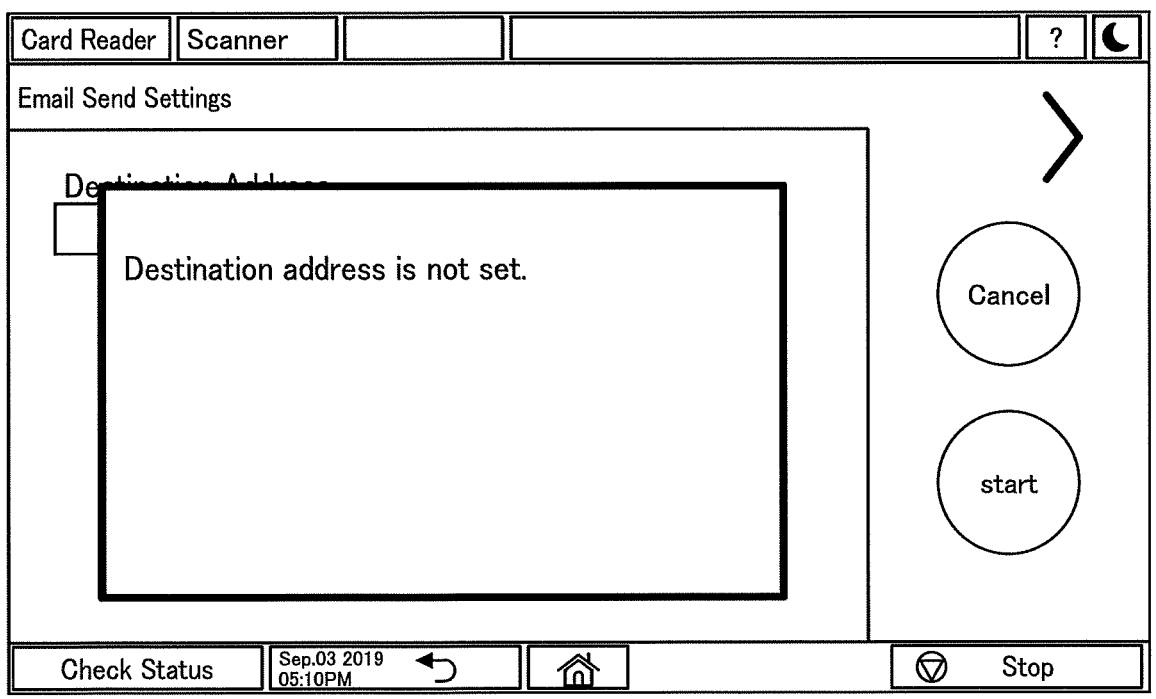
FIG. 11 is an illustration of an example of a screen displayed on the information processing apparatus, according to an embodiment of the present disclosure.

FIG. 10 and FIG. 11 are illustrations of examples of screens displayed on the information processing apparatus 10, according to the present embodiment. FIG. 10 illustrates an example of a screen when a setting value input by a user when configuring settings of a function "xxx" is invalid. The flow execution unit 311 automatically transitions to a settings screen of the function whose setting value is invalid, and displays a dialog box including an error message such as "Please reconsider the setting of xxx." as illustrated in FIG. 10. For example, a developer of the scan application 331 sets any desired message as the error message to displayed in the dialog box.

FIG. 11 illustrates an example of a screen when a destination address is not input in an e-mail transmission setting function. The flow execution unit 311 automatically transitions to a settings screen of a function whose setting value is not input, and displays a dialog box including an error message such as "Destination address is not set." as illustrated in FIG. 11.

When the flow execution unit 311 determines that the setting value input on the settings screen of the scan function is valid in step S31, the flow execution unit executes processes of steps S35 and subsequent steps. In step S35, the flow execution unit 311 determines whether the setting value input on the settings screen of the print function is valid. When the flow execution unit 311 determines that the setting value input on the settings screen of the print function is invalid, the flow execution unit executes processes of steps S36 to S38.

In step S36, the flow execution unit 311 requests the print function unit 340 to acquire a setting UI (the settings screen of the print function). In step S37, the flow execution unit 311 displays the settings screen of the print function acquired in step S36 in the frame. In step S38, the flow execution unit 311 performs processing to be performed when an error occurs. For example, the flow execution unit 311 displays an error message as illustrated in FIG. 10 or FIG. 11.

When the flow execution unit 311 determines that the setting value input on the settings screen of the print function is valid in step S35, the flow execution unit executes processes of steps S41 and subsequent steps. In step S41, the flow execution unit 311 sends the setting value for the scan function set in step S18 to the scan function unit 330. In step S42, the flow execution unit 311 sends the setting value for the print function set in step S22 to the print function unit 340.

In step S43, the flow execution unit 311 requests the scan function unit 330 to perform scanning. In step S44, the scan function unit 330 performs scanning using the setting value for the scan function received in step S41.

In step S45, the scan function unit 330 sends a notification indicating that scanning is completed to the flow execution unit 311. In step S46, the flow execution unit 311 requests the print function unit 340 to perform printing. The print function unit 340 is configured to print an image represented by scan data generated by the scan function unit 330. In step S47, the print function unit 340 performs printing using the setting value for the print function received in step S42. In step S48, the print function unit 340 sends a notification indicating that printing is completed to the flow execution unit 311.

Thus, in response to a request for executing a flow from a user, the information processing apparatus 10 according to the present embodiment performs validity determination on setting values of multiple functions used in executing a flow, before starting execution of the flow. Accordingly, the information processing apparatus 10 according to the present embodiment prevents the flow from being interrupted during processing due to an error in the setting values of the functions included in the flow.

Second Embodiment

In the first embodiment, the validity of a setting value for a function is checked for each of functions used in executing a flow. In the second embodiment, among functions used in execution of a flow, a setting value for a given function are compared with a setting value for another given function, to check validity of the setting values. For example, in the second embodiment, a setting value for the scan function unit 330 and a setting value for the print function unit 340 are compared with each other to determine the validity of the setting values between the functions.

Figure 12:
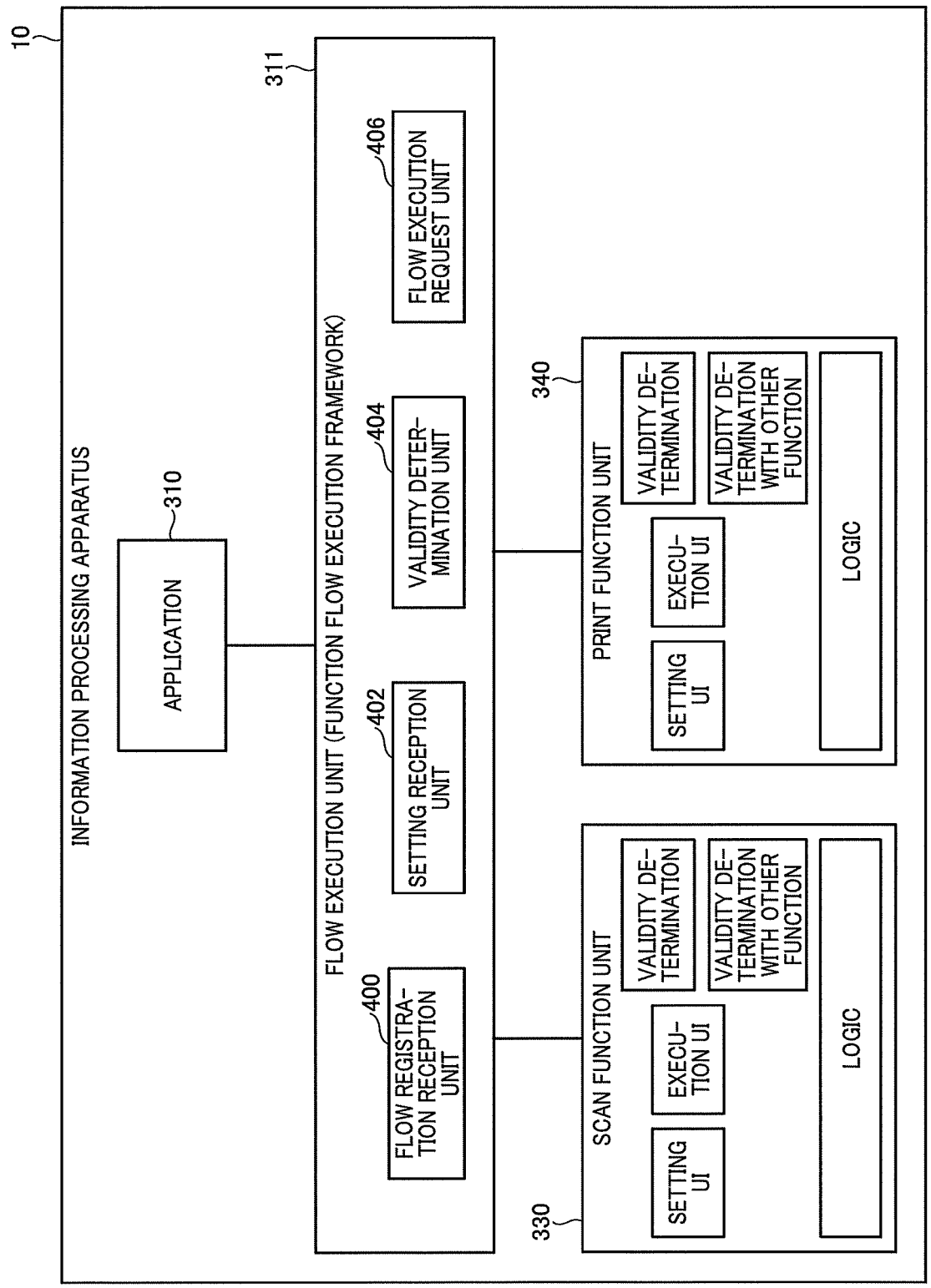
FIG. 12 is a block diagram illustrating an example of a functional configuration of a flow execution unit, according to an embodiment of the present disclosure.

FIG. 12 is a block diagram illustrating an example of the flow execution unit 311, according to the second embodiment. A part of the functional configuration illustrated in FIG. 12 is the same as the functional configuration illustrated in FIG. 6. Descriptions of functions and functional blocks that are the same as those of FIG. 6 are omitted below as appropriate.

In the information processing apparatus 10 illustrated in FIG. 12, multiple functions such as the scan function unit 330 and the print function unit 340, which are used by the application 310, which is activated, to execute a flow include a process of determining validity between own function and another function. The validity determination unit 404 of the flow execution unit 311 performs validity determination (validity check) on setting values between the multiple functions by using a process of validity determination with another function, the process of validity determination being included in each of the multiple functions. For example, the validity determination unit 404 performs validity determination between a setting value for the scan function and a setting value for the print function by using a process of validity determination with another function, the process being included in the scan function unit 330.

Figure 13:
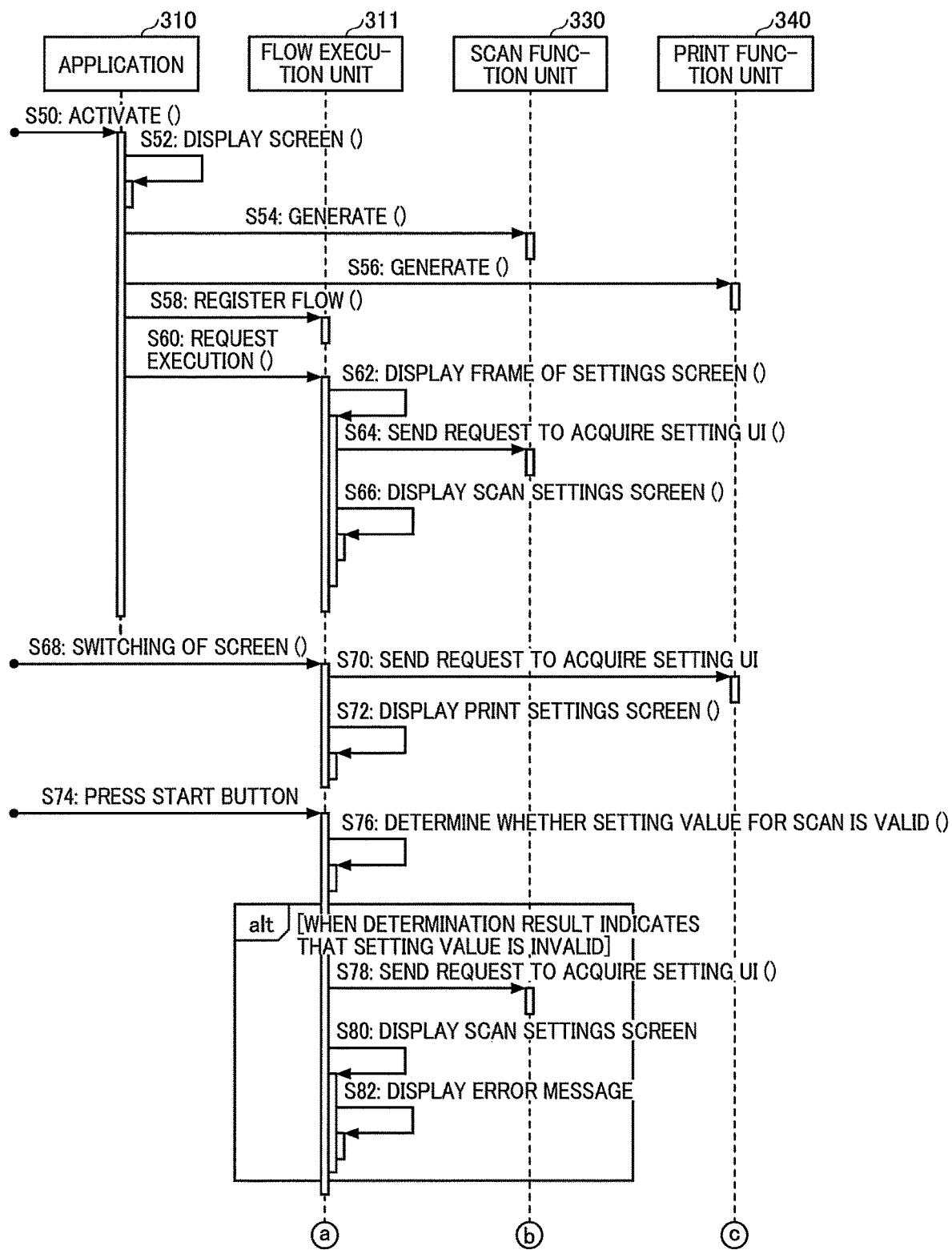
FIG. 13 is a sequence diagram (1/2) illustrating an example of operation performed by the information processing apparatus, according to an embodiment of the present disclosure.
Figure 14:
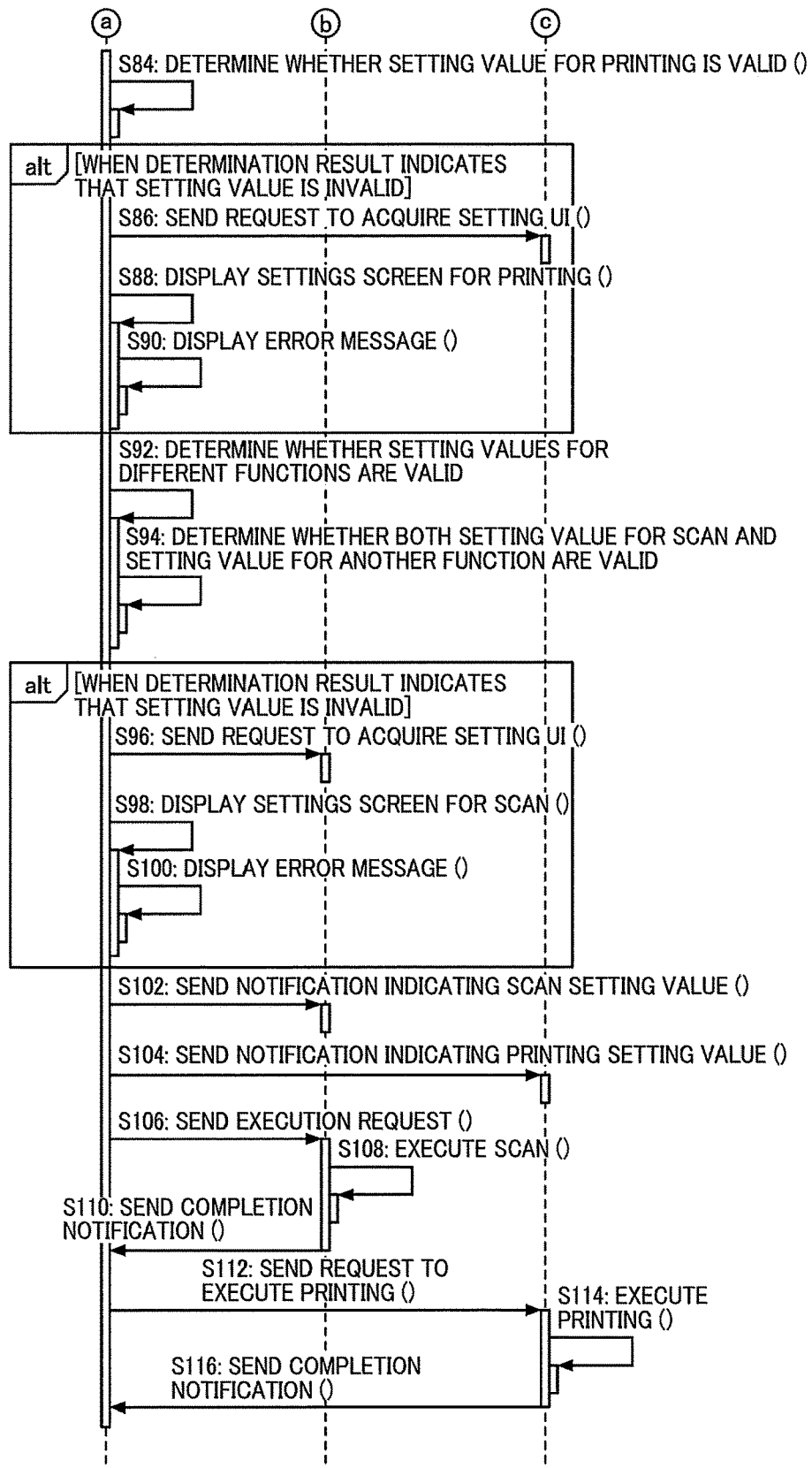
FIG. 14 is a sequence diagram (2/2) illustrating an example of operation performed by the information processing apparatus, according to an embodiment of the present disclosure.

FIG. 13 is a sequence diagram (1/2) illustrating an example of an operation performed by the information processing apparatus 10, according to the second embodiment. FIG. 14 is a sequence diagram (2/2) illustrating an example of an operation performed by the information processing apparatus 10, according to the second embodiment. Since a part of the sequence diagrams of FIG. 13 and FIG. 14 are the same as the sequence diagrams of FIG. 8 and FIG. 9, the redundant description thereof is omitted below as appropriate.

Processes of steps S50 to S90 is the same or substantially the same as the processes of steps S10 to S38 in FIG. 8 and FIG. 9. In step S92, the flow execution unit 311 performs validity determination between functions used for executing a flow. For example, in step S94, the flow execution unit 311 performs validity determination between a setting value for the scan function and a setting value for the print function by using the process of the validity determination with another function of the scan function unit 330.

Figure 15:
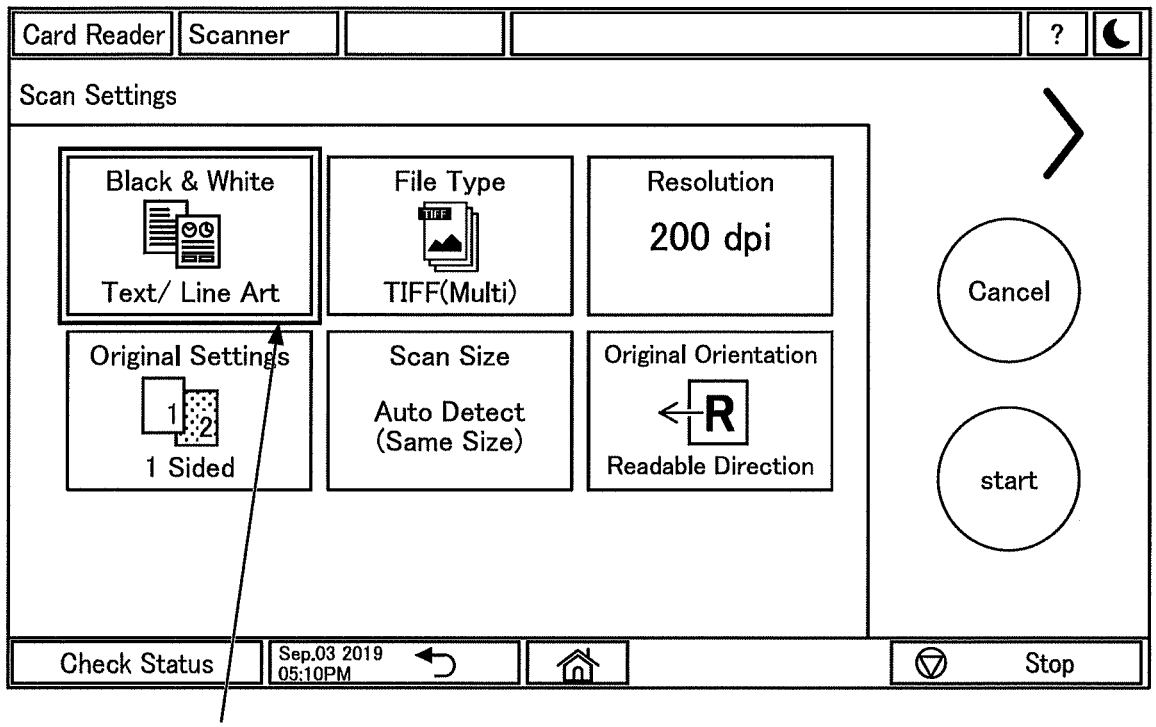
FIG. 15 is an illustration of an example of a screen displayed on the information processing apparatus, according to an embodiment of the present disclosure.
Figure 15:
Figure 15:
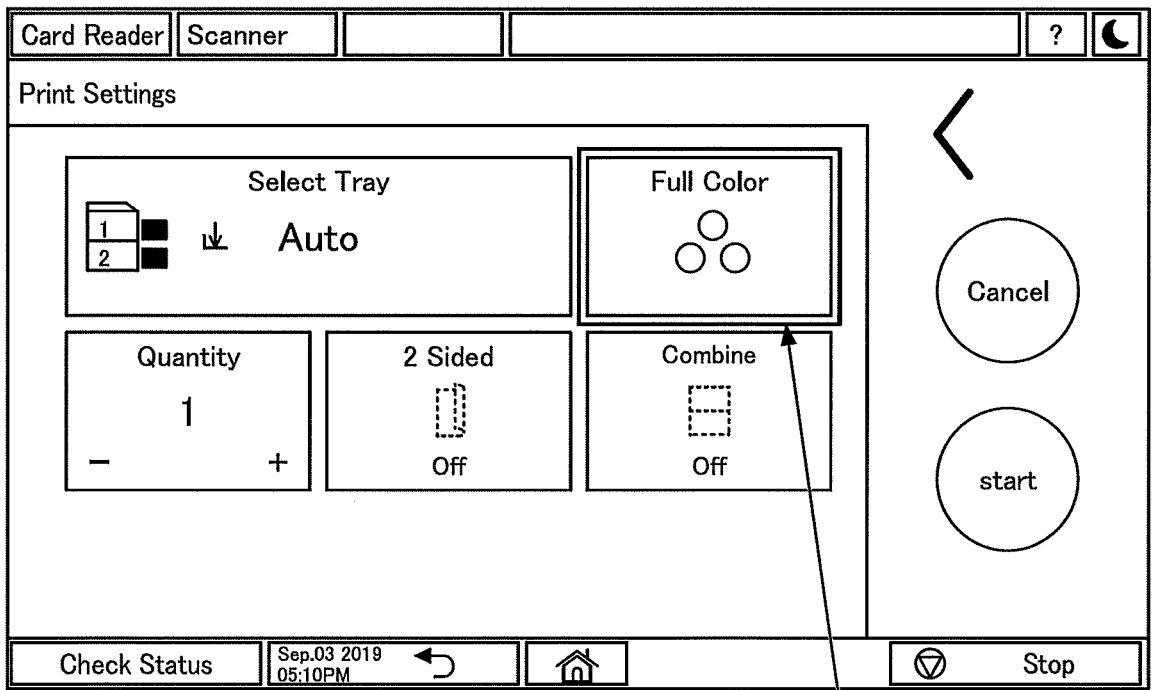

The validity determination between the functions performed in steps S92 to S94 is, for example, a process as illustrated in FIG. 15. FIG. 15 is an illustration of examples of screens displayed on the information processing apparatus 10, according to the present embodiment.

An upper screen in FIG. 15 is a settings screen of the scan function, and a lower screen in FIG. 15 is a settings screen of the print function. FIG. 15 illustrates an example of the scan function settings screen on which "black & white scan" is set. Further, FIG. 15 illustrates an example of the print function settings screen on which "color prints" is set. When an execution instruction for starting execution of a flow, such as pressing of a start button, is input in the state of FIG. 15, determination is made that the setting value input for each function is valid. However, in the example of FIG. 15, since "color prints" is input as the setting value for the print function, an image represented by a black-and-white image data obtained by black-and-white scanning is printed, even though the color print is selected.

Even in such the case, the information processing apparatus 10 according to the second embodiment detects input of an invalid setting value for a function, such as inconsistency with a setting value input to another function, by comparing setting values between functions.

When the flow execution unit 311 determines that there is no validity between the setting value for the scan function and the setting value for the print function, the flow execution unit 311 performs processes of steps S96 to S100. In step S96, the flow execution unit 311 requests the scan function unit 330 to acquire the setting UI. In step S98, the flow execution unit 311 displays the settings screen of the scan function acquired in step S96 in the frame. In step S100, the flow execution unit 311 performs processing to be performed when an error occurs. For example, the flow execution unit 311 displays an error message as illustrated in FIG. 16.

Figure 16:
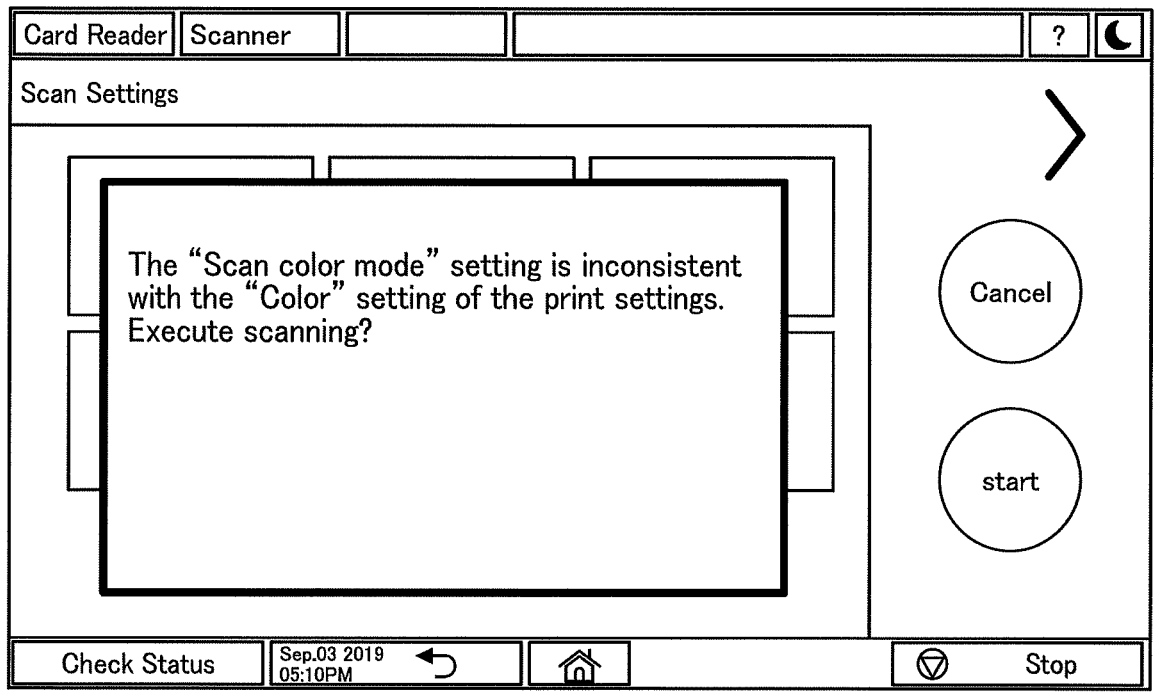
FIG. 16 is an illustration of an example of a screen displayed on the information processing apparatus, according to an embodiment of the present disclosure.

FIG. 16 is an illustration of an example of a screen displayed on the information processing apparatus 10, according to the second embodiment. FIG. 16 illustrates an example of a screen when the setting value of a "scan color mode" of the scan function is inconsistent with the setting value of a "color" of the print function. The flow execution unit 311 automatically transitions to a settings screen of the function whose setting value is inconsistent with a setting value of another function, and displays a dialog box including an error message as illustrated in FIG. 16.

When the flow execution unit 311 determines that there is validity between the setting value for the scan function and the setting value for the print function in steps S92 and S94, the flow execution unit 311 performs processes of step S102 and subsequent steps. Processes of S102 to S116 are performed in the same or substantially the same manner as described above referring to steps S41 to S48 of FIG. 9, and the redundant description is omitted.

Thus, in response to receiving an instruction to execute a flow from a user, the information processing apparatus 10 according to the second embodiment performs, for each of multiple functions used in executing the flow, processing of determining validity of a setting value of a given function with respect to a setting value of another function before starting execution of the flow. Accordingly, the information processing apparatus 10 according to the second embodiment detects an input of an invalid setting value between functions, based on inconsistency of setting values of functions included in a flow. Such the input of the invalid setting value is likely to be an input error by a user.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The description given above on an example in which the application 310 is installed in the operation device 11 or the terminal apparatus 20. In another example, the application 310 is a web application. In this case, some or all of the functions of the flow execution unit 311, the scan application 331, and the print application 341 may be implemented by a software program included in the main device.

The configuration of the information processing apparatus 10 according to the above-described embodiments is merely one example of a configuration that implements the embodiments disclosed herein. The configuration of the information processing apparatus 10 according to the above-describe embodiments can be modified without departing from the scope of the present disclosure, such as combining the above-described configuration with other elements.

In the conventional art, an application development platform installed in an image processing apparatus provides, for example, a user interface (referred to as a "UI" in the following description) and logic for each function. When the application development platform installed in the image processing apparatus handles a series of flows in which multiple functions are combined, the platform completes processing for a given function and then executes processing for the next function. For example, when a certain flow defines execution of processing of "function 2" after execution of processing of "function 1", the image processing apparatus first completes the processing of "function 1" and then executes the processing of the next "function 2".

Therefore, in the conventional arts, when the image processing apparatus receives an input of a setting value for a function and determines the validity of the setting value, the image processing apparatus first completes the processing of the "function 1" and thereafter receives an input of a setting value and checks the validity of the setting for the "function 2". For example, when the setting value of the "function 1" input by a user is valid and the setting value of "function 2" input by the user is invalid, the image processing apparatus does not determine that the setting value of the "function 2" is invalid until the image processing apparatus completes the processing of "function 1".

According to one or more embodiments of the present disclosure, an information processing apparatus is provided that is configured to perform validity determination for setting values of multiple functions used for execution of a flow before the execution of the flow.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The setting reception unit 402 is an example of setting reception means. The validity determination unit 404 is an example of validity determination means. The flow execution request unit 406 is an example of flow execution request means. The flow registration reception unit 400 is an example of flow registration reception means.

The invention claimed is:

1. An information processing apparatus that provides multiple functions including at least a first function and a second function, to an application, the information processing apparatus comprising circuitry configured to:
   receive an input of a first setting value for the first function and a second setting value for the second function, the first function and the second function being used by the application to execute a flow;
   after receiving an instruction to execute the flow and before the end of the execution of the flow, determine validity of the first setting value by a first validity determination process that is included in the first function and the second setting value by a second validity determination process that is included in the second function; and
   request execution of the flow using the first setting value and the second setting value in response to a determination result indicating that the first setting value and the second setting value are valid,
   wherein the circuitry determines whether one of the first setting value or the second setting value is contradictory to the other of the first setting value or the second setting value, thereby determining the validity of the first setting value and the second setting value.

2. The information processing apparatus of claim 1, wherein in case of receiving the determination result indicating that at least one of the first setting value or the second setting value is invalid, the circuitry displays a settings screen and an error message, the settings screen being displayed for at least one of the first function or the second function corresponding to the at least one of the first setting value or the second setting value determined as invalid.

3. The information processing apparatus of claim 1, wherein
   the circuitry compares the first setting value with the second setting value, to determine the validity of the first setting value and the second setting value.

4. The information processing apparatus of claim 1, wherein
   the circuitry determines the validity of the first setting value and the second setting value input on a settings screen of each of the first function and the second function by using a validity determination function included in the first function and the second function respectively.

5. The information processing apparatus of claim 1, wherein
   the circuitry receives, from the application, registration of the flow that uses the first function and the second function.

6. The information processing apparatus of claim 1, wherein
   the information processing apparatus includes an operation device and a main device communicable with the operation device, and
   the operation device includes the circuitry to receive the input of the first setting value and the second setting value, to determine the validity of the first setting value and the second setting value, and to request execution of the flow.

7. The information processing apparatus of claim 3, wherein the first function includes a scan function and the second function includes a print function.

8. The information processing apparatus of claim 7, wherein the circuitry automatically displays a setting screen for receiving a setting value upon determining that one of the first setting value or the second setting value is contradictory to the other of the first setting value or the second setting value.

9. The information processing apparatus of claim 7, wherein the first function includes an input function and the second function includes an output function, and
   wherein the output function, based on the second setting value, outputs data that is generated based on the first setting value by the input function.

10. A flow execution method performed by an information processing apparatus that provides multiple functions including at least a first function and a second function, to an application, the method comprising:
    receiving an input of a first setting value for the first function and a second setting value for the second function, the first function and the second function being used by the application to execute a flow;
    after receiving an instruction to execute the flow and before the end of the execution of the flow, determining validity of the first setting value by a first validity determination process that is included in the first function and the second setting value by a second validity determination process that is included in the second function; and requesting execution of the flow using the first setting value and the second setting value in response to a determination result indicating that the first setting value and the second setting value are valid, wherein the method further comprises determining whether one of the first setting value or the second setting value is contradictory to the other of the first setting value or the second setting value, thereby determining the validity of the first setting value and the second setting value.

11. A non-transitory computer-readable storage medium storing a plurality of instructions which, when executed by one or more processors of an information processing apparatus that provides multiple functions including at least a first function and a second function, to an application, causes the one or more processors to perform a method, the method comprising:

receiving an input of a first setting value for the first function and a second setting value for the second function, the first function and the second function being used by the application to execute a flow;

after receiving an instruction to execute the flow and before the end of the execution of the flow, determining validity of the first setting value by a first validity determination process that is included in the first function and the second setting value by a second validity determination process that is included in the second function; and requesting execution of the flow using the first setting value and the second setting value in response to a determination result indicating that the first setting value and the second setting value are valid, wherein the method further comprises determining whether one of the first setting value or the second setting value is contradictory to the other of the first setting value or the second setting value, thereby determining the validity of the first setting value and the second setting value.

* * * * *